United States Patent

Hashimoto et al.

(10) Patent No.: US 9,070,938 B2
(45) Date of Patent: Jun. 30, 2015

(54) TERMINAL LEAD

(71) Applicants: SHOWA DENKO K.K., Minato-ku, Tokyo (JP); Showa Denko Packaging Co., Ltd., Isehara-shi, Kanagawa (JP)

(72) Inventors: Daisuke Hashimoto, Oyama (JP); Takurou Watanabe, Oyama (JP); Keiichi Yokoi, Minato-ku (JP); Hiroshi Hata, Isehara (JP)

(73) Assignee: Showa Denko Packaging Co., Ltd., Kanagawa (JP)

( * ) Notice: Subject to any disclaimer, the term of this patent is extended or adjusted under 35 U.S.C. 154(b) by 203 days.

(21) Appl. No.: 13/723,340

(22) Filed: Dec. 21, 2012

(65) Prior Publication Data

US 2013/0164613 A1  Jun. 27, 2013

(30) Foreign Application Priority Data

Dec. 26, 2011 (JP) .................. 2011-282689

(51) Int. Cl.
| | |
|---|---|
| *H01M 2/30* | (2006.01) |
| *H01G 11/74* | (2013.01) |
| *H01G 11/76* | (2013.01) |
| *H01M 2/06* | (2006.01) |

(52) U.S. Cl.
CPC ............... *H01M 2/30* (2013.01); *H01G 11/74* (2013.01); *H01G 11/76* (2013.01); *H01M 2/06* (2013.01); *Y02E 60/13* (2013.01)

(58) Field of Classification Search
CPC ....... H01G 11/74; H01G 11/76; H01M 2/021; H01M 2/0212; H01M 2/0232; H01M 2/06; H01M 2/08; H01M 2/028; H01M 2/30; H01M 2/0286

USPC ......... 429/507, 508, 510, 535, 163, 170, 171, 429/173, 174, 178, 179, 180, 181, 184, 185, 429/21, 1, 211

See application file for complete search history.

(56) References Cited

U.S. PATENT DOCUMENTS

| | | |
|---|---|---|
| 6,291,098 B1 | 9/2001 | Shibuya et al. |
| 2007/0059596 A1* | 3/2007 | Mukai et al. .................. 429/185 |
| 2011/0305945 A1 | 12/2011 | Tada et al. |
| 2012/0082888 A1 | 4/2012 | Hashimoto et al. |

FOREIGN PATENT DOCUMENTS

| | | |
|---|---|---|
| JP | 59-38708 B2 | 9/1984 |
| JP | 10-302756 A | 11/1998 |
| JP | 2006-202577 A | 8/2006 |
| JP | 2010-165481 A | 7/2010 |
| JP | 2010-170979 A | 8/2010 |
| JP | 2010-245000 A | 10/2010 |

OTHER PUBLICATIONS

Yamazaki, Satoru JP 2006-202577 English language translation.*

* cited by examiner

*Primary Examiner* — Jonathan Jelsma
*Assistant Examiner* — Omar Kekia
(74) *Attorney, Agent, or Firm* — Keating & Bennett, LLP

(57) ABSTRACT

A terminal lead 1 includes an inner end portion 1a to be arranged inwardly of an exterior casing 9 which accommodates an electrochemistry element 6, an outer end portion 1b to be arranged outwardly of the exterior casing 9, and a plate-shaped metallic substrate 2 as a base material. An insulating resin film 4 is arranged at a portion of the terminal lead 1 corresponding to a seal portion 9x of the exterior casing 9. In this terminal lead 1, a surface coating layer 3 is formed on both surfaces 2p and 2p of the metallic substrate 2 in a thickness direction thereof. A coated amount of both widthwise end portions 3a and 3a of the surface coating layer 3 formed on both surfaces 2p and 2p of the metallic substrate 2 in the thickness direction is less than that a widthwise intermediate portion 3b thereof.

8 Claims, 6 Drawing Sheets

TERMINAL LEAD

CROSS-REFERENCE TO RELATED APPLICATIONS

This application claims priority to Japanese Patent Application No. 2011-282689 filed on Dec. 26, 2011, and the entire disclosure of which is incorporated herein by reference in its entirety.

BACKGROUND OF THE INVENTION

1. Field of the Invention

The present invention relates to a terminal lead, a method of producing the terminal lead, and an electrochemistry device (e.g., a lithium ion secondary battery, an electric double-layer capacitor) equipped with the terminal lead.

2. Background Art

For example, in a lithium ion secondary battery as an electrochemistry device, a battery element including electrodes (current collectors) and electrolyte (electrolyte solution) are enclosed in an exterior casing. The opening edge portions of the exterior casing are welded together by heat sealing, so that the battery element is sealed in the exterior casing (see, e.g., Patent Document 1).

An outer film forming the exterior casing is constituted by a plurality of layers including an outermost layer made of polyethylene terephthalate (PET) or nylon and an innermost layer which comes into contact with electrolyte made of heat adhesive resin. An intermediate layer of the outer film is constituted by a metallic foil, such as, e.g., an aluminum foil, a SUS foil (stainless steel foil), etc., to prevent invasion of water from the outside and evaporation of the electrolyte from the inside. The outermost layer of the outer film is designed to protect the metallic foil of the intermediate layer and provides protection against possible external force such as stabbing.

A terminal lead of a battery equipped with a battery element accommodated in an exterior casing is generally equipped with a plate-shaped metallic substrate as a base material. The terminal lead is integrally provided with an inner end portion arranged inwardly of the exterior casing and an outer end portion arranged outwardly of the exterior casing and extended outwardly from the seal portion of the exterior casing. A portion of the terminal lead corresponding to the seal portion of the exterior casing is welded to the outer film with a heat adhesive resin of the innermost layer of the outer film by heat sealing. In some cases, however, the terminal lead may penetrate the innermost layer of the outer film to be brought into contact with the metallic foil as an intermediate layer, resulting in electric short.

To secure electrical insulation between the terminal lead and the metallic foil of the intermediate layer, an insulating resin film is arranged at the portion of the terminal lead corresponding to the seal portion of the exterior casing (see, e.g., Patent Documents 2 to 6).

The adhesion between the terminal lead and the insulating resin film decreases as time passes due to influence of electrolyte. To prevent the problem, in some conventional terminal leads, a chitosan layer containing chitosan or chitosan derivative is formed on the entire surface of the metallic substrate by a coating method as a surface coating layer (see, e.g., Patent Documents 4 and 6).

LIST OF PRIOR ART

[Patent Document 1] Japanese Examined Laid-open Patent Application Publication No. S59-38708
[Patent Document 2] Japanese Unexamined Laid-open Patent Application Publication No. H10-302756
[Patent Document 3] Japanese Unexamined Laid-open Patent Application Publication No. 2010-165481
[Patent Document 4] Japanese Unexamined Laid-open Patent Application Publication No. 2010-170979
[Patent Document 5] Japanese Unexamined Laid-open Patent Application Publication No. 2010-245000
[Patent Document 6] Japanese Unexamined Laid-open Patent Application Publication No. 2006-202577

SUMMARY OF THE INVENTION

However, the electrical resistivity of such a surface coating layer is larger than the electrical resistivity of a metallic substrate of a terminal lead. Therefore, in cases where such a surface coating layer is evenly formed on the entire surface of the metallic substrate of the terminal lead, when a joining member (i.e., a member to be joined), such as, e.g., a current collector of a battery element, a bus bar, etc., is electrically connected to the terminal lead, the surface coating layer interposed between the terminal lead and the joining member acts as an electric resistance portion, which results in an increased electric resistance therebetween.

On the other hand, if the coated amount of the surface coating layer is decreased to reduce the electric resistance, the adhesion between the terminal lead and the insulating resin film decreases, causing a problem that electrolyte in the exterior casing is more likely to leak outside of the exterior casing through a gap between the terminal lead and the insulating resin film.

The present invention was made in view of the aforementioned problems, and aims to provide a terminal lead capable of preventing leakage of fluid such as electrolyte accommodated in an exterior casing therefrom and also capable of reducing an electric resistance between the terminal lead and a joining member. The present invention also aims to provide a method of producing the terminal lead, and an electrochemistry device equipped with the terminal lead.

Other objects and advantages of the present invention will be apparent from the following preferred embodiments.

The present invention provides the following means.

(1) A terminal lead includes an inner end portion to be arranged inwardly of an exterior casing which accommodates an electrochemistry element, an outer end portion to be arranged outwardly of the exterior casing, a plate-shaped metallic substrate as a base material, and an insulating resin film to be arranged at a portion of the metallic substrate corresponding to a seal portion of the exterior casing. A a surface coating layer is formed on both surfaces of the metallic substrate in a thickness direction of the metallic substrate. A coated amount of both widthwise end portions of the surface coating layer formed on both surfaces of the metallic substrate in the thickness direction is less than a coated amount of a widthwise intermediate portion of the surface coating layer formed on both surfaces of the metallic substrate in the thickness direction.

(2) The terminal lead as recited in Item (1), wherein the surface coating layer contains one or more chemical compounds selected from the group consisting of chitosan and chitosan derivative.

(3) A production method of a terminal lead including an inner end portion to be arranged inwardly of an exterior casing which accommodates an electrochemistry element, an outer end portion to be arranged outwardly of the exterior casing, a plate-shaped metallic substrate as a base material, and an insulating resin film to be arranged at a portion of the metallic substrate corresponding to a seal portion of the exterior casing, includes a step of cutting an elongated member of the terminal lead in which a surface coating layer is formed on both surfaces of an elongated member of the metallic substrate in a thickness direction of the metallic substrate. A coated amount of both widthwise end portions of the surface coating layer formed on both the surfaces of the elongated member of the metallic substrate in the thickness direction is less than a coated amount of a widthwise intermediate portion of the surface coating layer formed on both the surfaces of the elongated member of the metallic substrate in the thickness direction.

(4) The production method as recited in Item (3), wherein the surface coating layer contains one or more chemical compounds selected from the group consisting of chitosan and chitosan derivative.

(5) An electrochemical device equipped with the terminal lead as recited in Item (1) or (2).

Effects of the Invention

The present invention exerts the following effects.

According to the terminal lead as recited in Item (1), by forming the surface coating layer on both surfaces of the metallic substrate of the terminal lead in the thickness direction, leakage of an accommodated fluid such as electrolyte accommodated in the exterior casing can be prevented. Furthermore, by setting the coated amount of both widthwise end portions of the surface coating layer formed on both surfaces of the metallic substrate in the thickness direction to be smaller than the coated amount of the widthwise intermediate portion of the surface coating layer formed on both surfaces of the metallic substrate in the thickness direction, the electric resistance between the terminal lead and the joining member can be reduced.

According to the terminal lead as recited in the aforementioned Item (2), when the surface coating layer contains one or more chemical compounds selected from the group consisting of chitosan and chitosan derivative, the adhesion between the terminal lead and the insulating resin film can be assuredly improved.

According to the method of producing the terminal lead as recited in the aforementioned Item (3), the terminal lead according to Item (1) or (2) can be efficiently obtained.

According to the method of producing the terminal lead as recited in the aforementioned Item (4), when the surface coating layer contains one or more chemical compounds selected from the group consisting of chitosan and chitosan derivative, the adhesion between the terminal lead and the insulating resin film can be assuredly improved.

According to the electrochemistry device as recited in the aforementioned Item (5), the same effects as in the terminal lead according to Item (1) or (2) can be exerted.

DETAILED DESCRIPTION OF THE PREFERRED EMBODIMENT

Next, an embodiment of the present invention will be explained with reference to the attached drawings.

Figure 1:
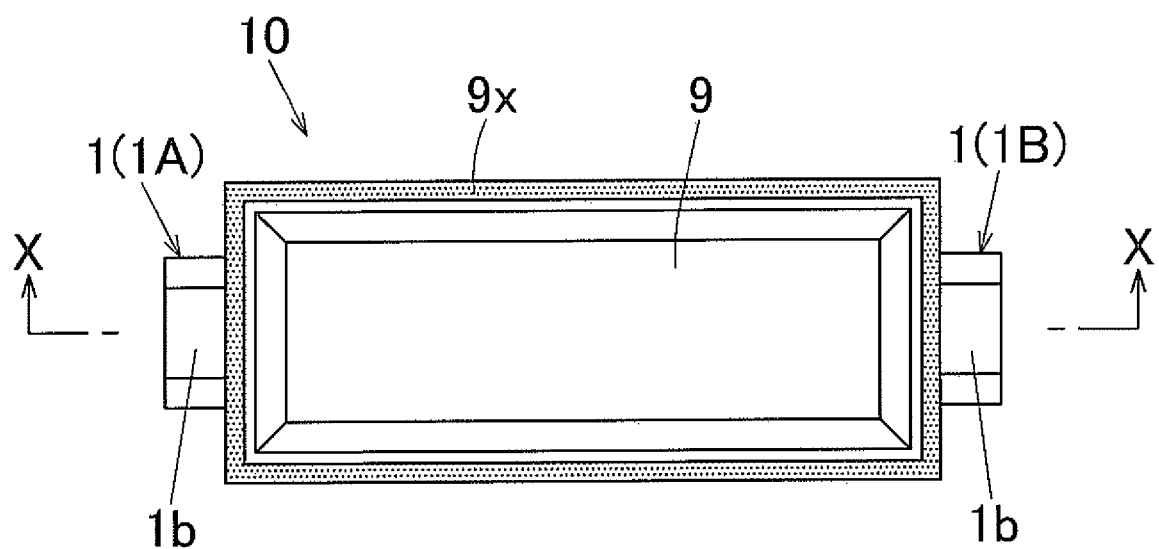
FIG. 1 is a plane view showing a lithium ion secondary battery as an electrochemistry device equipped with a terminal lead according to an embodiment of the present invention.
Figure 2:
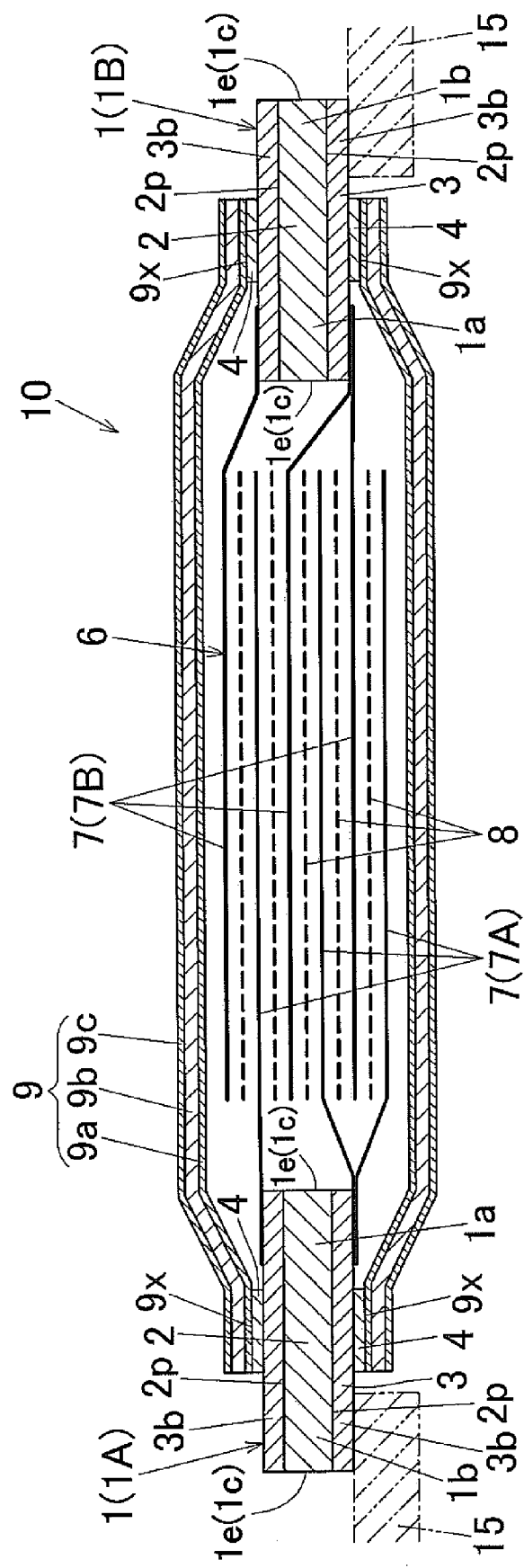
FIG. 2 is a cross-sectional view taken along the line X-X in FIG. 1.

As shown in FIGS. 1 and 2, a terminal lead 1 of this embodiment of the present invention is a member to be provided as a positive electrode side terminal lead 1A and/or a negative electrode side terminal lead 1B for a lithium ion secondary battery 10 as an electrochemistry device. In the lithium ion secondary battery 10 of this embodiment, the terminal lead 1 is used as the positive electrode side terminal lead 1A and the negative electrode side terminal lead 1B.

In the lithium ion secondary battery 10 of this embodiment, as shown in FIG. 2, a battery element 6 as an electrochemistry element for an electrochemistry device is accommodated in an exterior casing 9.

The exterior casing 9 is made of, in the same manner as in a conventional exterior casing, an outer film constituted by a plurality of layers in which, for example, a heat adhesive (thermoplastic) resin layer as an innermost layer 9a which comes into contact with electrolytic solution (electrolyte), a synthetic resin layer as an outermost layer 9c, and a metallic layer as an intermediate layer 9b are arranged in a laminated manner.

The heat adhesive resin layer (i.e., innermost layer 9a) is made of a resin selected from polyolefin resins, such as, e.g., a high-density polyethylene, a low-density polyethylene, a straight-chain low-density polyethylene, a polyethylene series ionomer, polypropylene, etc. The synthetic resin layer (i.e., outermost layer 9c) is intended to secure a mechanical strength to protect the metallic layer (i.e., intermediate layer 9b), and is made of, for example, polyester such as polyethylene terephthalate (PET), or polyamide such as nylon, etc. The metallic layer (i.e., intermediate layer 9b) is intended to prevent invasion of water from the outside and evaporation of electrolytic fluid (electrolyte) from the inside, and is constituted by a metallic foil, such as, e.g., an aluminum foil, a SUS foil (stainless steel foil), etc. In this embodiment, it can be configured such that the outermost layer 9c of the exterior casing 9 is made of polyethylene terephthalate (PET) and a nylon layer (not illustrated) is joined (adhered) to the inner surface of the outermost layer 9c by an adhesive material, etc.

The battery element 6 is constituted by stacking plate-shaped (including "foil-shaped") positive electrode current collectors 7A and plate-shaped (including "foil-shaped") negative electrode current collectors 7B via separators 8 and/or electrolyte (solid electrolyte, gel electrolyte). A positive electrode material (LiCoO$_2$, etc.) is joined to the surface of the positive electrode current collector 7A, and a negative electrode material (LiC$_6$, etc.) is joined to the surface of the negative electrode current collector 7B. In this embodiment, the positive electrode current collectors 7A and the negative electrode current collectors 7B of the battery element 6 correspond to the inner side joining members to be electrically connected to the inner end portions 1a of the corresponding positive or negative electrode terminal leads 1A and 1B in the exterior casing 9.

The battery element 6 is accommodated in the exterior casing 9 and the opening edge portions of the exterior casing 9 are welded by heat sealing, so the battery element 6 is sealed in the exterior casing 9 in a liquid-tight manner. In FIG. 1, the dot-hatched portion of the exterior casing 9 denotes a seal portion 9x of the exterior casing 9 formed by heat sealing.

As shown in FIG. 2, the terminal lead 1 is integrally provided with an inner end portion 1a arranged inwardly of the exterior casing 9 and an outer end portion 1b arranged outwardly of the exterior casing 9 and extended outwardly of the exterior casing 9 from the seal portion 9x of the exterior casing 9. The inner end portion 1a of the terminal lead 1 is one longitudinal end portion of the terminal lead 1, and the outer end portion 1b of the terminal lead 1 is the other longitudinal end portion of the terminal lead 1.

As shown in FIGS. 2 to 6, the terminal lead 1 is equipped with a plate-shaped (including "foil-shaped") metallic substrate 2 having superior electrical conductivity as a substrate. The material of the metallic substrate 2 is not specifically limited, and can be any material arbitrarily selected from various types of metals. Specifically, in the case where the terminal lead 1 is the positive electrode side terminal lead 1A, it is preferable that the material of the metallic substrate 2 is aluminum or its alloy, especially A1000 series aluminum alloy. In the case where the terminal lead 1 is the negative electrode side terminal lead 1B, it is preferable that the material of the metallic substrate 2 is oxygen-free copper (JIS (Japanese Industrial Standards) H3100:C1020) or tough pitch copper (JISH3100:C1100), etc. Also, it is especially preferable that both surfaces of the metallic substrate 2 in the thickness direction and both side faces of the metallic substrate 2 in the widthwise direction are previously subjected to a chemical conversion treatment (examples: chromate treatment, non-chromate treatment) and/or an electrolyte treatment (example: anodizing, plate processing). The plate processing includes a non-electrolytic plating.

Figure 3:
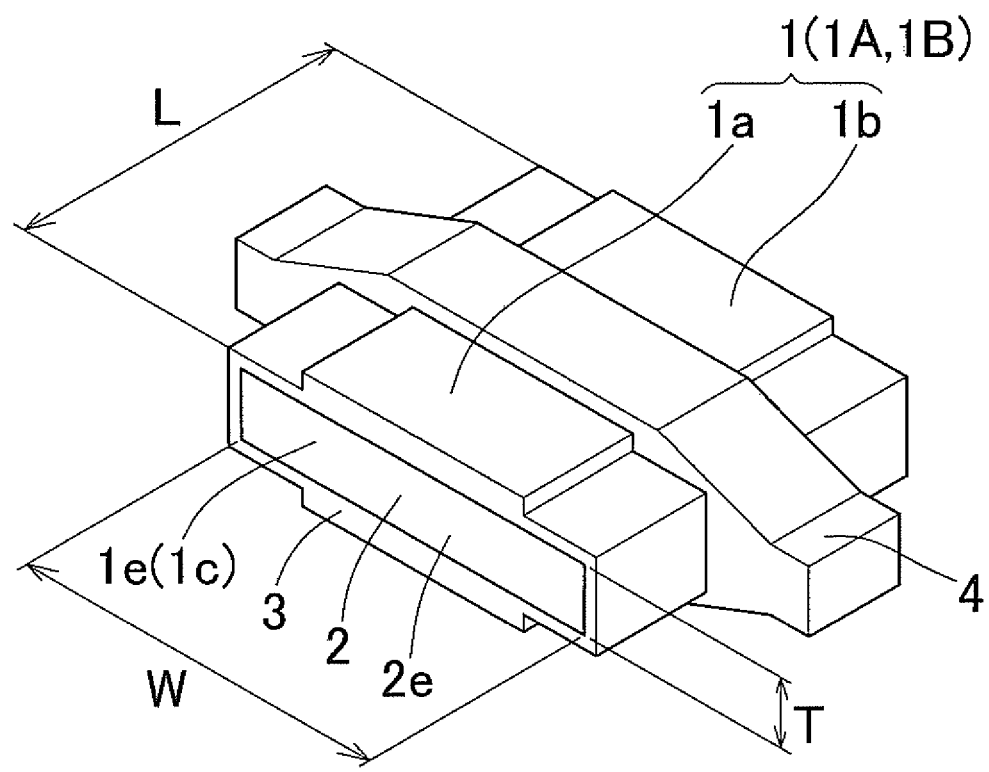
FIG. 3 is a perspective view of the terminal lead having an insulating resin film.

In FIG. 3, the length L, the width W and the thickness T of the metallic substrate 2 of the terminal lead 1 are set according to the size, the capacity, etc., of the lithium ion secondary battery 10, and are not specifically limited. For example, the length L can be set to: 20-70 mm, the width W can be set to 20-120 mm, and the thickness T can be set to 0.1-1.0 mm.

As shown in FIGS. 3 to 6, a surface coating layer 3 is formed along the entire both surfaces 2p and 2p of the metallic substrate 2 of the terminal lead 1 in the thickness direction and both side faces 2s and 2s of the metallic substrate 2 of the terminal lead 1 in the widthwise direction. On the other hand, the surface coating layer 3 is not formed on both end faces of the metallic substrate 2 of the terminal lead 1 in the longitudinal direction, i.e., the end face 1e on the inner end portion 1a side of the terminal lead 1 and the end face 1e on the outer end portion 1b side of the terminal lead 1. Therefore, at both end faces 1e and 1e of the terminal lead 1, the metallic substrate 2 is exposed outwardly. The reference numeral "2e" denotes an exposed portion of the metallic substrate 2 of each end face 1e of the terminal lead 1.

The surface coating layer 3 is a layer primarily intended to enhance the adherence between the terminal lead 1 and the insulating resin film 4 which will be explained later, and contains organic polymer resin (example: ethylene-acrylic resin, chitosan group) as a main component, and further contains inorganic components (example: chromium, zirconium, titan, silicon) as additional ingredients as required. In this embodiment, the surface coating layer 3 contains chitosan series as organic polymer resin, specifically one or more chemical compounds selected from the group consisting of chitosan and chitosan derivative. The chitosan derivative is not specifically limited, and can be carboxymethyl chitosan, cationized chitosan, hydroxyalkylated chitosan, glycerol chitosan, sodium of these chitosan acids. In this way, when the surface coating layer 3 contains chitosan series, the adherence between the terminal lead 1 and the insulating resin film 4 can be assuredly improved. The electrical resistivity of the surface coating layer 3 is larger than the electrical resistivity of the metallic substrate 2 of the terminal lead 1. A producing method of the surface coating layer 3 (i.e., coating method) will be explained later.

The thickness of the surface coating layer 3 is significantly small as compared with the length L, the width W, and the thickness T of the metallic substrate 2 of the terminal lead 1. Therefore, the length, the width, and the thickness of the terminal lead 1 can be considered to be equal to the length L, the width W, and the thickness T of the metallic substrate 2.

Figure 4:
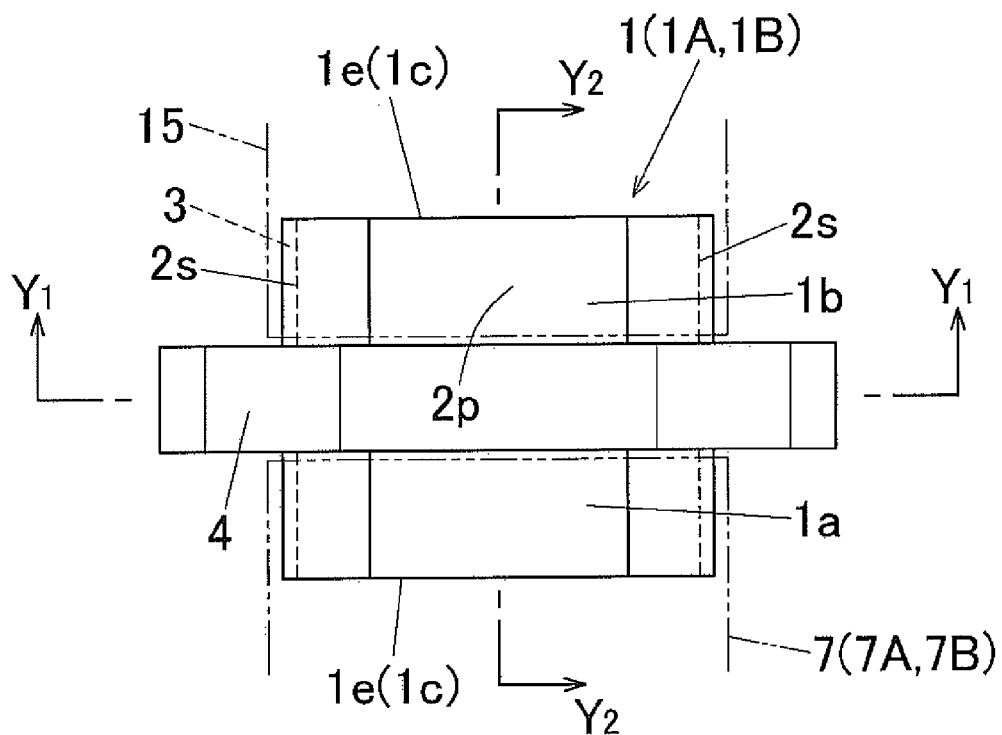
FIG. 4 is a plane view of the terminal lead having the insulating resin film.
Figure 5:
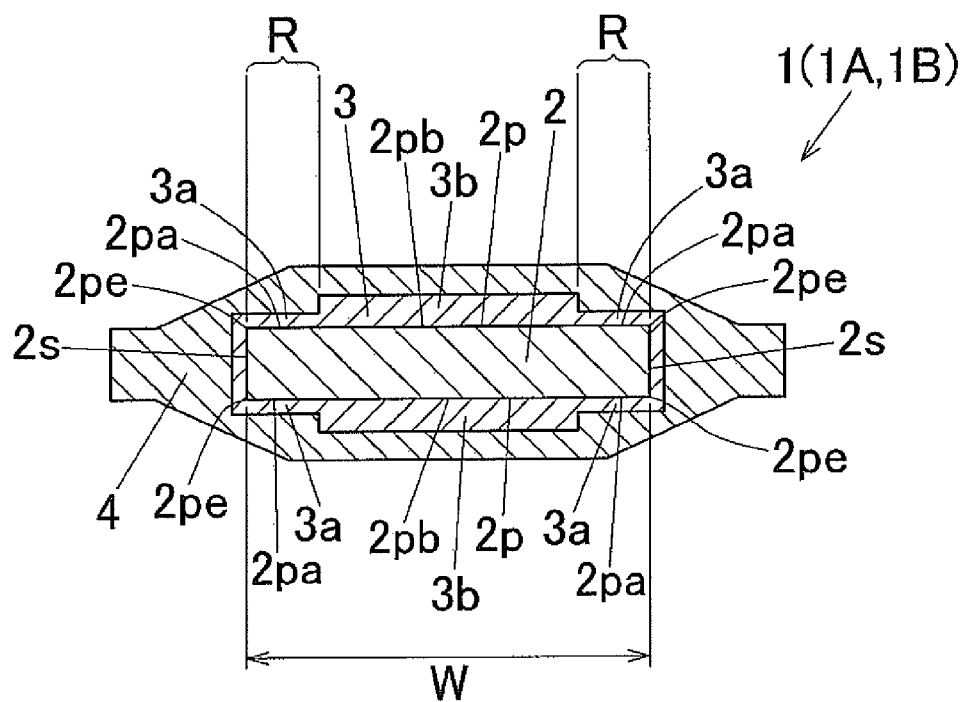
FIG. 5 is a cross-sectional view taken along the line Y1-Y1 in FIG. 4.
Figure 6:
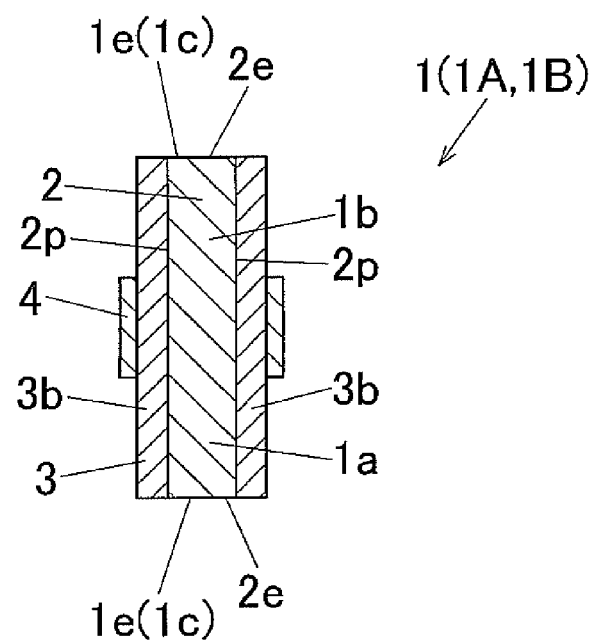
FIG. 6 is a cross-sectional view taken along the line Y2-Y2 in FIG. 4.

As shown in FIGS. 3 to 5 (especially as shown in FIG. 5), the coated amount of both widthwise end portions 3a and 3a of the surface coating layer 3 formed on both widthwise end portions 2pa and 2pa of both surfaces 2p and 2p of the metallic substrate 2 of the terminal lead 1 in the thickness direction is smaller than the coated amount of the widthwise intermediate portion 3b of the surface coating layer 3 formed at the widthwise intermediate portion 2pb of both surfaces 2p and 2p of the metallic substrate 2 of the terminal lead 1 in the thickness direction. The details of the coated amount of the surface coating layer 3 will be explained later.

In this terminal lead 1, an insulating resin film 4 is fixed to a portion of the terminal lead 1 corresponding to the seal portion 9x of the exterior casing 9 of the terminal lead 1 via the surface coating layer 3 in a manner such that the insulating resin film 4 covers the entire circumference of the portion of the terminal lead 1 corresponding to the seal portion 9x. In this embodiment, the position of the terminal lead 1 to which the insulating resin film 4 is attached is a longitudinal intermediate position of the terminal lead 1. In this fixed state, the adherence between the terminal lead 1 and the insulating resin film 4 is enhanced by the surface coating layer 3. With this, leakage of electrolyte in the exterior casing 9 to the outside is assuredly prevented for a long period of time.

In the same manner as in a conventional insulating resin film, the insulating resin film 4 is intended to secure electrical insulation between the terminal lead 1 and the metallic layer as the intermediate layer 9b of the exterior casing 9, and is made of electrical insulating resin, such as, e.g., polyethylene, polypropylene, etc.

As a method of attaching the insulating resin film 4 to the terminal lead 1, it is possible to employ, e.g., a method using heat sealing in which an insulating resin film 4 is heated and melted to be adhered to the terminal lead 1, and a method using an adhesive material in which the insulating resin film 4 is adhered to the terminal lead 1 using an adhesive material. In the case of employing the attaching method using heat sealing, it is preferable that at least the contact surface of the insulating resin film 4 with which the terminal lead 1 comes into contact is formed by acid modified polyethylene modified by maleic acid (acid modified polyethylene) or acid modified polypropylene modified by maleic acid (acid modified polypropylene) to assuredly improve the adherence between the terminal lead 1 and the insulating resin film 4.

In this terminal lead 1, the terminal lead 1 is welded to the exterior casing 9 (specifically, the innermost layer 9a of the exterior casing 9) by heat sealing for welding the opening edge portions of the exterior casing 9 together via the insulating resin film 4 at the same time as the welding of the opening edge portions of the exterior casing 9. Therefore, as shown in FIG. 2, the terminal lead 1 is joined to the exterior casing 9 via the insulating resin film 4.

As shown in FIG. 2, in the lithium ion secondary battery 10 equipped with the terminal lead 1, each of the positive and negative current collectors 7 (7A, 7B) of the battery element 6 is electrically connected, at the inner side of the exterior casing 9, to the inner end portion 1a of each of corresponding positive and negative terminal leads 1 (1A, 1B) by being joined by a joining method, such as, e.g., ultrasonic welding, in a state in which the positive and negative current collectors 7 are superposed to at least one of both surfaces of the inner end portion 1a in the thickness direction so as to cover approximately the entire widthwise region thereof (see dashed-two dotted line).

Furthermore, as shown in FIG. 2, in this lithium ion secondary battery 10, each of bus bars 15 and 15 for the positive and negative electrodes is electrically connected, at the outside of the exterior casing 9, to the outer end portion 1b of the corresponding positive and negative electrode side terminal leads 1 (1A, 1B) by being joined by a joining method, such as, e.g., welding, brazing, caulking, etc., in a state in which each of bus bars 15 and 15 is superposed to at least one of both surfaces of the outer end portion 1b in the thickness direction so as to cover approximately the entire widthwise region thereof (see dashed-two dotted line). In this embodiment, the bus bar 15 corresponds to an outer joining member to be electrically connected to the terminal lead 1 (specifically, the outer end portion 1b of the terminal lead 1) at the outside of the exterior casing 9.

The terminal lead 1 of this embodiment has been conceived based on the following findings of the inventors.

The inventors conducted endurance tests on a lithium ion secondary battery 10 to investigate leaking portions of electrolyte as an accommodated fluid accommodated in an exterior casing 9 of the lithium ion secondary battery 10. As a result, it was found that the leakage of electrolyte tends to occur through a gap not formed at the widthwise both end portions of the terminal lead 1 between the terminal lead 1 and the insulating resin film 4 but formed at the widthwise intermediate portion of the terminal lead 1. It was also found that, when the coated amount of the surface coating layer 3 is increased, the leakage of electrolyte can be controlled, but the electric resistance between the terminal lead 1 and the joining member (i.e., current collectors 7, bus bar 15, etc.) tends to increase. Therefore, the inventors found the fact that if the coated amount of both widthwise end portions 3a and 3a of the surface coating layer 3 is decreased with respect to the coated amount of the widthwise intermediate portion 3b of the surface coating layer 3, the leakage of electrolyte can be prevented and the electric resistance between the terminal lead 1 and the joining member can be reduced, and completed the present invention based on the findings.

That is, as shown in FIG. 5, in the terminal lead 1 of this embodiment, the coated amount of each of the widthwise end portions 3a and 3a of the surface coating layer 3 formed on both widthwise end portions 2pa and 2pa of both surfaces 2p and 2p of the metallic substrate 2 of the terminal lead 1 in the thickness direction is set to be less than the coated amount of the widthwise intermediate portion 3b of the surface coating layer 3 formed on the widthwise intermediate portion 2pb of both surfaces 2p and 2p of the metallic substrate 2 of the terminal lead 1 in the thickness direction. By doing so, the leakage of electrolyte can be prevented. Furthermore, the electric resistance between the terminal lead 1 and the joining member (e.g., current collector 7, bus bar 15) can be reduced.

As to the region R where the coated amount of the surface coating layer 3 formed on each surface 2p of the metallic substrate 2 of the terminal lead 1 in the thickness direction is to be reduced, it is preferable that the region R is defined by a region having a width of at least 5% of the width W of the metallic substrate 2 and ranging from each widthwise side end 2pe of the surface 2p of the metallic substrate 2 toward the widthwise intermediate portion 2pb of the metallic substrate 2. Especially, it is more preferable that the region R is defined by a region having a width of up to 30% of the width W of the metallic substrate 2 and ranging from each widthwise side end 2pe of the surface 2p of the metallic substrate 2 toward the widthwise intermediate portion 2pb. By setting the region R as specified above, leakage of electrolyte can be assuredly prevented and, furthermore, the electric resistance between the terminal lead 1 and the joining member (i.e., current collector 7, bus bar 15, etc.) can be assuredly reduced.

The coated amount of the widthwise intermediate portion 3b of the surface coating layer 3 is not specifically limited, but preferred to be especially 1 to 500 mg/m$^2$. Furthermore, it is especially preferable that the coated amount of both widthwise end portions 3a and 3a of the surface coating layer 3 is less than the coated amount of the widthwise intermediate portion 3b of the surface coating layer 3 by 30 to 80%. By setting the coated amount of the surface coating layer 3 as mentioned above, leakage of electrolyte can be more assuredly prevented, and furthermore, the electric resistance between the terminal lead 1 and the joining member (i.e., current collector 7, bus bar 15, etc.) can be assuredly reduced.

The coated amount of the surface coating layer 3 formed on each of both widthwise side faces 2s and 2s of the metallic substrate 2 of the terminal lead 1 is not limited.

Next, preferred methods of producing the terminal lead 1 will be explained.

Figure 7:
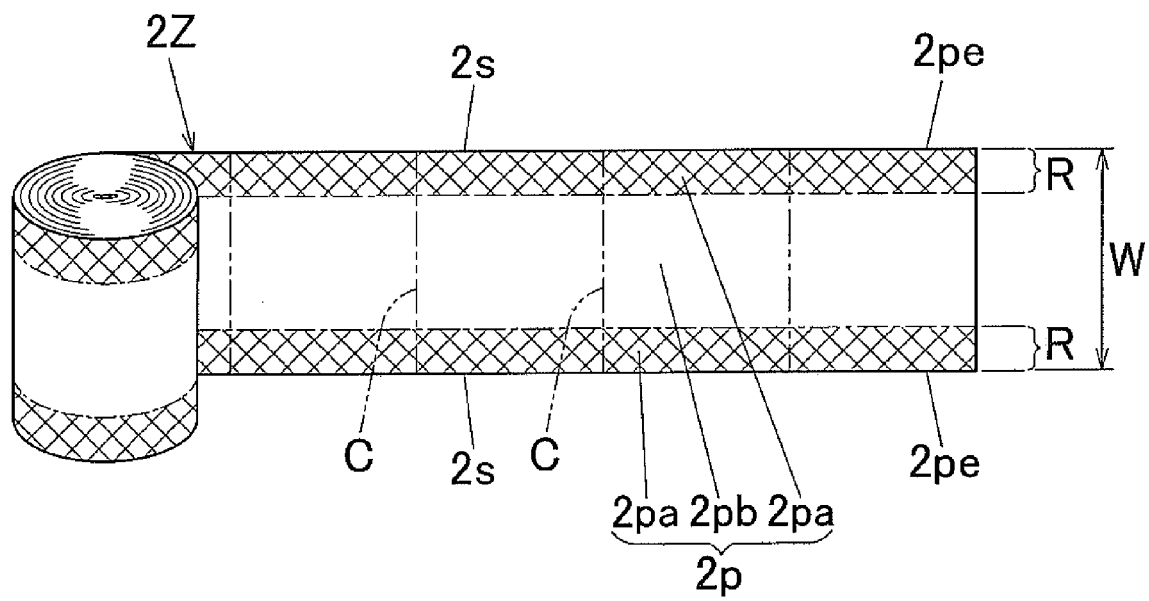
FIG. 7 is a perspective view of an elongated member of a metallic substrate for the terminal lead.

As shown in FIG. 7, as a long band shape metallic primary sheet for the metallic substrate 2 of the terminal lead 1, an elongated member 2Z for the metallic substrate 2 is prepared. The elongated member 2Z has the same cross-sectional shape and the same dimension as those of the metallic substrate 2 and extends continuously in the longitudinal direction. That is, the width of the elongated member 2Z is set to be the same as the width W of the metallic substrate 2, and the thickness of the elongated member 2Z is set to be the same as the thickness T of the metallic substrate 2. On the other hand, the length of the elongated member 2Z is set to be remarkably longer than the length L of the metallic substrate 2.

Next, a surface coating layer 3 is formed on the entire both surfaces 2p and 2p of the elongated member 2Z of the metallic substrate 2 in the thickness direction and the entire both side faces 2s and 2s of the elongated member 2Z of the metallic substrate 2 in the width direction. At this time, the surface coating layer 3 is formed so that the coated amount of the widthwise end portions 3a and 3a of the surface coating layer 3 formed on both widthwise end portions 2pa and 2pa of both surfaces 2p and 2p of the elongated member 2Z in the thickness direction is less than the coated amount of the widthwise intermediate portion 3b of the surface coating layer 3 formed on the widthwise intermediate portion 2pb of both surfaces 2p and 2p of the elongated member 2Z in the thickness direction. The most preferable region R where the coated amount of the surface coating layer 3 on both surfaces 2p and 2p of the elongated member 2Z of the metallic substrate 2 in the thickness direction is to be reduced has been explained above.

Figure 8:
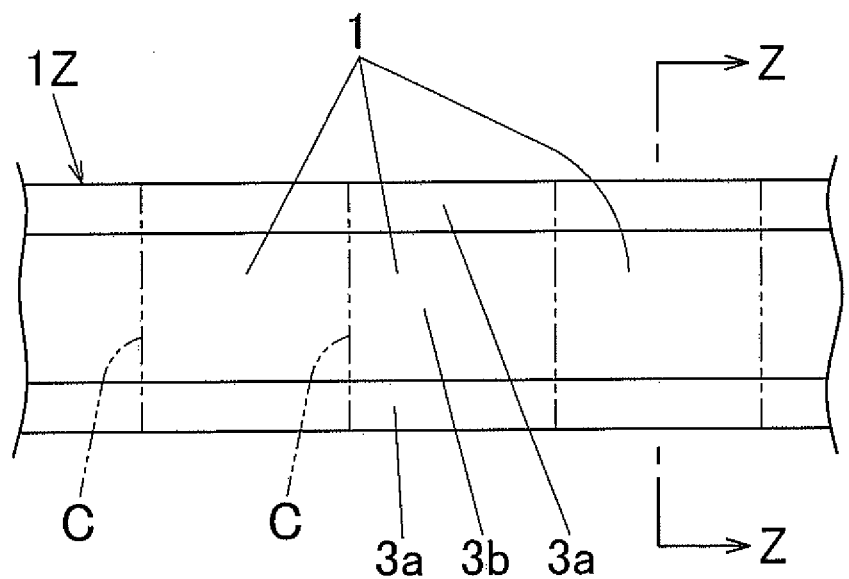
FIG. 8 is a plane view of an elongated member for the terminal lead.
Figure 9:
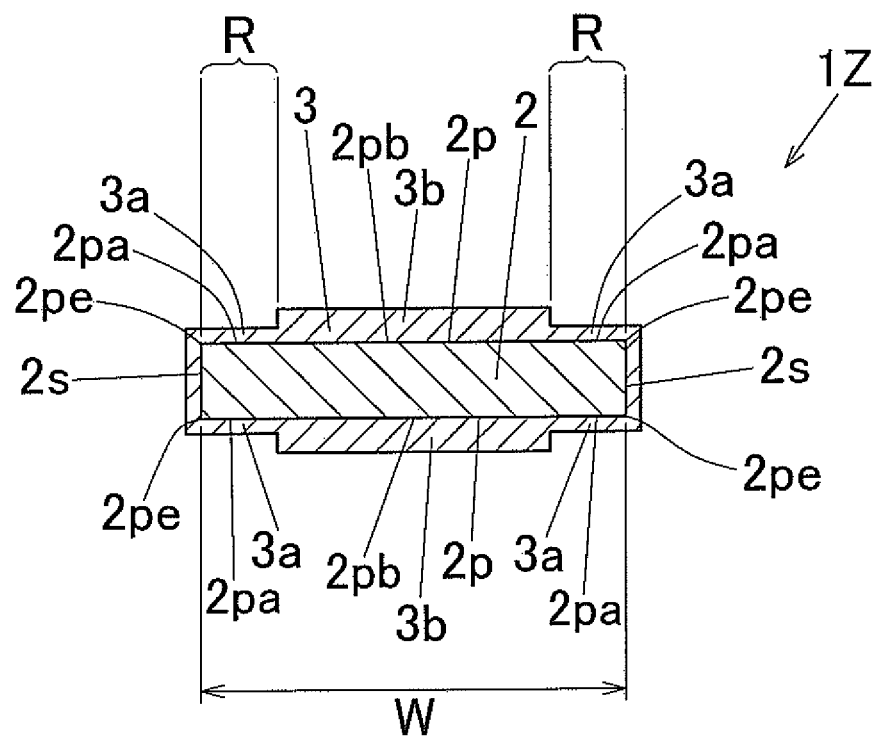
FIG. 9 is a cross-sectional view taken along the line Z-Z in FIG. 8.

By forming the surface coating layer 3 on both surfaces 2p and 2p of the elongated member 2Z of the metallic substrate 2 in the thickness direction and both side faces 2s and 2s of the elongated member 2Z of the metallic substrate 2 in the width direction, as shown in FIGS. 8 and 9, an elongated member 1Z of the terminal lead 1 as a long band shape primary sheet for the terminal lead 1 is produced.

The surface coating layer 3 can be formed by various methods, but it is especially preferred to be formed by a dip coating method, a roll coating method (example: a gravure coating method, a reverse roll coating method, a kiss-coating method, a knife-over-roll coating method, and a die coating method), a spray coating method, etc. Specifically, it is preferable that the surface coating layer 3 is formed by applying and drying a predetermined coating fluid to predetermined surfaces of the elongated member 2Z of the metallic substrate 2 of the terminal lead 1. As the predetermined coating fluid, it is preferable to use a fluid in which an organic polymeric resin (example: ethylene-acrylic resin, chitosan group) as a main component is dissolved in a solvent (example: water, organic solvent). Furthermore, as needed, inorganic components (example: chromium, zirconium, titanium, and silicone) are added as additive components to the coating fluid. As a drying method, it is general to use a method of evaporating the solvent component contained in the coating fluid by heat. As the heating method, it is possible to use a convective heat transfer in which heated air is applied, a conductive heat transfer in which the elongated member 2Z of the metallic substrate 2 itself is heated, and a radiation heat transfer in which infrared heater is used for heating, or a combination of these methods.

As a method of setting the coated amount of both widthwise end portions 3a and 3a of the surface coating layer 3 formed on both widthwise end portions 2pa and 2pa of both surfaces 2p and 2p of elongated member 2Z of the metallic substrate 2 in the thickness direction to be less than the coated amount of the widthwise intermediate portion 3b of the surface coating layer 3, for example, the following several methods can be exemplified.

In a first method, an even amount of a coating fluid is applied to the entire both surfaces 2p and 2p of the elongated member 2Z of the metallic substrate 2 in the thickness direction and the applied coating fluid is dried. Thereafter, a coating fluid is again applied only to the widthwise intermediate portion 2pb on both surfaces 2p and 2p of the elongated member 2Z in the thickness direction and the applied coating fluid is dried. Thus, the coated amount of both widthwise end portions 3a and 3a of the surface coating layer 3 is reduced relative to the coated amount of the widthwise intermediate portion 3b of the surface coating layer 3.

In a second method, in the case of using a gravure coating method as a method of forming a surface coating layer 3, the shape, depth, mesh, etc., of the gravure cell formed on the peripheral surface of the gravure roll are changed between the intermediate portion of the peripheral surface of the gravure cell and both end portions of the peripheral surface of the gravure cell to reduce the coated amount of both widthwise end portions 3a and 3a of the surface coating layer 3.

In a third method, in the case of using a die coating method as a method of forming a surface coating layer 3, the gap of the coating fluid opening formed at the tip of the die is changed between the widthwise intermediate portion and both end portions to reduce the coated amount of both widthwise end portions 3a and 3a of the surface coating layer 3.

As another method, the following method can be exemplified. An even amount of a coating fluid is applied to the entire surfaces 2p and 2p of the elongated member 2Z of the metallic substrate 2 in the thickness direction and a strong airflow is applied to both widthwise end portions 2pa and 2pa of the surfaces 2p and 2p of the elongated member 2Z in the thickness direction before or during the drying process of the coating fluid to blow some of the coating fluid applied to both widthwise end portions 2pa and 2pa away, to reduce the coated amount of both widthwise end portions 3a and 3a of the surface coating layer 3.

Next, the elongated member 1Z for a terminal lead 1 is cut in the longitudinal direction into rectangular shapes having the same length by a shearing process or a laser cutting process. This process is called "cutting step." The cutting length of the elongated member 1Z is the same as the length L of the metallic substrate 2 of the terminal lead 1. In FIG. 8 (FIG. 7), the two-dot dash line denotes a cutting line of the elongated member 1Z (elongated member 2Z of the metallic substrate 2) of the terminal lead 1. In this embodiment, the elongated member 1Z is cut straightly in a direction perpendicular to the longitudinal direction. By this cutting, a plurality of terminal leads 1 can be produced. In other words, a plurality of terminal leads 1 can be obtained from the elongated member 1Z. In this way, by obtaining a plurality of terminal leads 1 from the elongated member 1Z of the terminal lead 1, the terminal lead 1 can be efficiently produced.

In the terminal lead 1 obtained in the aforementioned manner, the cut surface 1c on one end side constitutes an end face 1e of the terminal lead 1 on the inner end portion 1a side, and the cut surface 1c on the other end side constitutes an end face 1e of the terminal lead 1 on the outer end portion 1b side. In other words, both longitudinal end faces 1e and 1e of the terminal lead 1 are cut surfaces 1c and 1c. Therefore, no surface coating layer 3 is formed on both the end faces 1e and 1e, and the metallic substrate 2 is exposed at both the end faces 1e and 1e.

Next, an insulating resin film 4 is attached to a portion of the terminal lead 1 corresponding to the seal portion 9x of the exterior casing 9 so as to cover the entire circumference thereof.

Through the aforementioned steps, the terminal lead 1 having the insulating resin film 4 is produced.

In this embodiment, after producing the terminal lead 1 by cutting the elongated member 1Z of the terminal lead 1 into predetermined lengths, an insulating resin film 4 is attached to the terminal lead 1, to thereby produce the terminal lead 1 having the insulating resin film 4. In the present invention, however, other than the above, a terminal lead 1 having an insulating resin film 4 can be produced by cutting an elongated member 1Z into predetermined lengths after attaching a plurality of insulating resin films 4 to the elongated member 1Z of the terminal lead 1 in advance at certain intervals.

Although the above explanation is directed to one embodiment of the present invention, the present invention is not limited to the aforementioned embodiment and can be changed in various ways.

For example, in the aforementioned embodiment, when producing the terminal lead 1, the elongated member 1Z of the terminal lead 1 is cut straightly in a direction perpendicular to the longitudinal direction of the elongated member 1Z. In the present invention, however, the elongated member 1Z of the terminal lead 1 can be cut into other states or shapes. For example, the elongated member 1Z can be cut in a direction oblique to the longitudinal direction of the elongated member 1Z, or can be into various shapes, such as, e.g., an arc shape, a wave shape, a saw tooth shape, etc.

In the aforementioned embodiment, the technical concept of the present invention is applied to a lithium ion secondary battery 10 as an electrochemical device and its terminal lead 1. In the present invention, however, the technical concept of the present invention can be applied to, for example, an electric double layer capacitor as an electrochemistry device and its terminal lead 1, and the technical concept of the present invention can be applied to other electrochemistry devices and their terminal leads.

Example

Next, a specific example and a comparative example of the present invention are described.

Example

A negative electrode terminal lead and a positive electrode terminal lead of an example were produced in accordance with the following procedures.

<Production of Negative Electrode Terminal Lead>

As a long band-shape metal primary sheet for a metallic substrate 2 of a negative electrode terminal lead 1B, an elongated member 2Z of an oxygen free copper sheet 2 having a width of 6 cm and a thickness of 0.2 mm was prepared. Both surfaces 2p and 2p of the elongated member 2Z in the thickness direction and both side faces 2s and 2s of the elongated member 2Z in the width direction were subjected to a nickel plating process of forming a thickness of about 2 μm in advance. Next, with a gravure coating method using a gravure roll, chitosan group water solution (coating fluid) containing a chitosan group as a main component was coated on both surfaces 2p and 2p of the elongated member 2Z in the thickness direction and dried at a drying temperature of 200° C., so that a chitosan layer 3 as a surface coating layer was formed on both the entire surfaces 2p and 2p of the elongated member 2Z in the thickness direction and both the side faces 2s and 2s of the elongated member 2Z in the widthwise direction with an even coated amount. Next, a chitosan group water solution was applied again only on the widthwise intermediate portion 2pb of both surfaces 2p and 2p of the elongated member 2Z in the thickness direction and dried at a drying temperature of 200° C. With this, the coated amount of both widthwise end portions 3a and 3a of the chitosan layer 3 formed on both widthwise end portions 2pa and 2pa of the surfaces 2p and 2p of the elongated member 2Z in the thickness direction was reduced relative to the coated amount of the widthwise intermediate portion 3b of the chitosan layer 3. The coated amount of the widthwise intermediate portion 3b of the chitosan layer 3 was 50 mg/m². Also, the coated amount of both widthwise end portions 3a and 3a of the chitosan layer 3 was 25 mg/m². The region R where the coated amount of the surface coating layer 3 formed on both surfaces 2p and 2p of the elongated member 2Z of the metallic substrate 2 in the thickness direction was reduced was a region having a width of up to 15% of the width W (W=6 cm) of the elongated member 2Z of the metallic substrate 2 and ranging from both widthwise end sides 2pe and 2pe of both surfaces 2p and 2p of the elongated member 2Z of the metallic substrate 2 in the thickness direction toward each widthwise intermediate portion 2pb side. The chitosan layer 3 contained one or more chemical compounds selected from the group consisting of chitosan and chitosan derivative. The elongated member 1Z of the terminal lead 1 was produced in this way.

Next, the elongated member 1Z of the terminal lead 1 was cut into a rectangular shape having a length of 5 cm in the longitudinal direction. With this, a terminal lead 1 having a length of 5 cm, a width of 6 cm, and a thickness of 0.2 mm was produced. Both longitudinal end faces 1e and 1e of the terminal lead 1 were cut faces 1c and 1c, and therefore the chitosan layer 3 was not formed on both end faces 1e and 1e with the oxygen free copper sheet 2 as a substrate exposed.

Next, a polypropylene film modified with maleic acid having a width of 1 cm was attached as the insulating resin film 4 by heat sealing to the longitudinal intermediate portion of the terminal lead 1 so as to cover the entire circumference of the terminal lead 1. The width of the polypropylene film modified with maleic acid (i.e., insulating resin film 4) denotes a longitudinal dimension of the terminal lead 1. In this way, a negative electrode terminal lead 1B having an insulating resin film 4 was produced.

<Production of Positive Electrode Terminal Lead>

As a long band-shape metal primary sheet for a metallic substrate 2 of a positive electrode terminal lead 1A, an elongated member 2Z of a A1000 series aluminum sheet 2 having a width of 6 mm and a thickness of 0.2 mm was prepared. A positive electrode terminal lead 1A having an insulating resin film 4 was produced in the same manner as in the production procedure of the negative electrode terminal lead 1B of the aforementioned Example.

<Production of the Lithium Ion Secondary Battery>

A lithium ion secondary battery was produced using the negative and positive electrode terminal leads 1B and 1A having the insulating resin films 4 of the aforementioned Example.

Comparative Example

A negative electrode terminal lead and a positive electrode terminal lead according to a comparative example was produced in accordance with the following procedures.

<Production of Negative Electrode Terminal Lead>

A negative electrode terminal lead having an insulating resin film was produced by the same production procedures as the negative electrode terminal lead 1B of the aforementioned example, except that an even coated amount of the chitosan layer 3 was evenly applied to both the entire surfaces 2p and 2p of the elongated member 2Z of the oxygen free copper sheet 2 as a metal primary sheet for a metallic substrate 2 in the thickness direction and both side faces 2s and 2s of the elongated member 2Z in the widthwise direction. The coated amount of the chitosan layer 3 was 35 mg/m².

<Production of Positive Electrode Terminal Lead>

A positive electrode terminal lead having an insulating resin film was produced by the same production procedures as the positive electrode terminal lead 1A of the aforementioned example, except that an even coated amount of the chitosan layer 3 was evenly applied to both the entire surfaces 2p and 2p of the elongated member 2Z of A1000 series aluminum sheet 2 as a metal primary sheet for the metallic substrate 2 in the thickness direction and both side faces 2s and 2s of the elongated member 2Z in the widthwise direction. The coated amount of the chitosan layer 3 was 35 mg/m².

<Production of Lithium Ion Secondary Battery>

A lithium ion secondary battery was produced using the negative and positive electrode terminal leads having the insulating resin films of the aforementioned comparative example.

<Evaluation>

The lithium ion secondary battery of the aforementioned Example and the lithium ion secondary battery of the aforementioned Comparative Example were stored for a long time (storage period: 3 months) under a high temperature and high humidity environment with a temperature of 65° C. and a humidity of 95%. As a result, leakage of electrolyte did not occur in the lithium ion secondary battery of Example. On the other hand, leakage of electrolyte occurred in the lithium ion secondary battery of Comparative Example.

Also, the electric resistance between the negative electrode terminal lead 1B and the bus bar 15 when the outer end portion 1b of the negative electrode terminal lead 1B of the aforementioned Example and the bus bar 15 were electrically connected was measured, and the electric resistance between the negative electrode terminal lead of the aforementioned Comparative Example and the bus bar when the outer end portion and the bus bar were electrically connected were measured. As a result, the electric resistance of the former (Example) was smaller than the electric resistance of the latter (Comparative Example).

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

INDUSTRIAL APPLICABILITY

The present invention is applicable to a terminal lead used as a positive electrode terminal lead or a negative electrode terminal lead, a method of producing the terminal lead, and an electrochemistry device equipped with the terminal lead (example: lithium ion secondary battery, electrical double layer capacitor).

DESCRIPTION OF THE REFERENCE NUMERALS

1: terminal lead
1A: positive electrode side terminal lead
1B: negative electrode side terminal lead
1a: inner end portion of terminal lead
1b: outer end portion of terminal lead
1Z: elongated member of terminal lead
2: metallic substrate
2p, 2p: both surfaces of the metallic substrate in the thickness direction
2pa, 2pa: both widthwise end portions of both surfaces of the metallic substrate in the thickness direction
2pb: widthwise intermediate portion of both surfaces of the metallic substrate in the thickness direction
2s, 2s: both widthwise side faces of the metallic substrate
2Z: elongated member of the metallic substrate
3: surface coating layer
3a, 3a: both widthwise end portions of the surface coating layer
3b: widthwise intermediate portion of surface coating layer
4: insulating resin film
6: battery element (electrochemistry element)
7: current collector (joining member)
9: exterior casing
9x: seal portion of the exterior casing
10: lithium ion secondary battery (electrochemistry device)
15: bus bar (joining member)

The invention claimed is:

1. A terminal lead comprising:
an inner end portion to be arranged inwardly of an exterior casing which accommodates an electrochemical element;
an outer end portion to be arranged outwardly of the exterior casing;
a plate-shaped metallic substrate as a base material;
an insulating resin film to be arranged at a portion of the metallic substrate corresponding to a seal portion of the exterior casing; and
a surface coating layer formed on both surfaces of the metallic substrate in a thickness direction of the metallic substrate; wherein
a coated amount of both widthwise end portions of the surface coating layer formed on both the surfaces of the metallic substrate in the thickness direction is less than a coated amount of a widthwise intermediate portion of the surface coating layer formed on both the surfaces of the metallic substrate in the thickness direction.

2. The terminal lead as recited in claim 1, wherein the surface coating layer contains one or more chemical compounds selected from the group consisting of chitosan and chitosan derivative.

3. A production method of a terminal lead including an inner end portion to be arranged inwardly of an exterior casing which accommodates an electrochemical element, an outer end portion to be arranged outwardly of the exterior casing, a plate-shaped metallic substrate as a base material, and an insulating resin film to be arranged at a portion of the metallic substrate corresponding to a seal portion of the exterior casing, the method comprising the steps of:
cutting an elongated member of the terminal lead in which a surface coating layer is formed on both surfaces of an elongated member of the metallic substrate in a thickness direction of the metallic substrate, and
coating the surface coating layer on the metallic substrate such that a coated amount of both widthwise end portions of the surface coating layer formed on both surfaces of the elongated member of the metallic substrate in the thickness direction is less than a coated amount of a widthwise intermediate portion of the surface coating layer formed on both surfaces of the elongated member of the metallic substrate in the thickness direction.

4. The production method as recited in claim 3, wherein the surface coating layer contains one or more chemical compounds selected from the group consisting of chitosan and chitosan derivative.

5. An electrochemical device equipped with the terminal lead as recited in claim 1.

6. The electrochemical device as recited in claim 5, wherein the surface coating layer contains one or more chemical compounds selected from the group consisting of chitosan and chitosan derivative.

7. The terminal lead as recited in claim 1, wherein the surface coating layer is provided on an entirety of both surfaces of the metallic substrate in the thickness direction of the metallic substrate.

8. The production method as recited in claim 3, further comprising the step of entirely coating both surfaces of the elongated member of the metallic substrate in the thickness direction with the surface coating layer.

* * * * *